(12) United States Patent
Ito

(10) Patent No.: US 7,294,669 B2
(45) Date of Patent: Nov. 13, 2007

(54) SEALANT HAVING IMPROVED DYNAMIC DURABILITY

(75) Inventor: Hiroshi Ito, Osaka (JP)

(73) Assignee: Kaneka Corporation, Osaka (JP)

( * ) Notice: Subject to any disclaimer, the term of this patent is extended or adjusted under 35 U.S.C. 154(b) by 183 days.

(21) Appl. No.: 11/101,576

(22) Filed: Apr. 8, 2005

(65) Prior Publication Data

US 2005/0234170 A1    Oct. 20, 2005

Related U.S. Application Data

(60) Provisional application No. 60/564,954, filed on Apr. 26, 2004.

(30) Foreign Application Priority Data

Apr. 16, 2004  (JP) ............................... 2004-122122

(51) Int. Cl.
    *C08G 77/08*  (2006.01)
(52) U.S. Cl. ...................... 524/588; 524/296; 524/425; 524/431; 528/16; 528/17; 528/18; 528/21; 528/901
(58) Field of Classification Search ................ 524/588, 524/296, 431, 425; 528/17, 16, 18, 21, 901
    See application file for complete search history.

(56) References Cited

U.S. PATENT DOCUMENTS

| | | | |
|---|---|---|---|
| 5,648,427 | A | 7/1997 | Fujita et al. |
| 6,077,896 | A | 6/2000 | Yano et al. |
| 6,410,640 | B1 * | 6/2002 | Fukunaga et al. .......... 524/588 |

FOREIGN PATENT DOCUMENTS

| | | |
|---|---|---|
| EP | 0 520 426 A1 | 12/1992 |
| EP | 0 546 310 A2 | 6/1993 |
| EP | 0 902 042 A1 | 3/1999 |

* cited by examiner

*Primary Examiner*—Margaret G. Moore
(74) *Attorney, Agent, or Firm*—Sughrue Mion, PLLC

(57) ABSTRACT

An object of the present invention is to provide a low-modulus, high elongation sealant having improved dynamic durability, desirable mechanical properties, and good workability. The present invention provides a sealant containing an oxyalkylene polymer (A) having a number-average molecular weight of 20,000 to 50,000 and 0.8 or more of reactive silicon groups per molecule on average; 10 parts by weight or more of a plasticizer (B) per 100 parts by weight of the polymer (A); a filler (C); and a curing catalyst (D). This sealant has an improved durability and can achieve the above-described object.

2 Claims, No Drawings

SEALANT HAVING IMPROVED DYNAMIC DURABILITY

This application claims priority from Japanese Patent Application No. 2004-122122 filed on Apr. 16, 2004, in the Japanese Intellectual Property Office, and U.S. Provisional Patent Application No. 60/564,954 filed on Apr. 26, 2004, in the United States Patent and Trademark Office, the disclosures of which are incorporated herein by reference in their entirety.

TECHNICAL FIELD

The present invention relates to a sealant that has improved dynamic durability and contains a reactive silicon group-containing oxyalkylene polymer having a silicon-containing functional group capable of forming crosslinks through siloxane bonding (hereinafter this functional group is also referred to as "reactive silicon group"), a plasticizer, a filler, and a curing catalyst. This sealant has excellent dynamic durability, desirable mechanical properties, e.g., low modulus and high elongation, and high workability.

BACKGROUND ART

Polymers having reactive silicon groups cure by formation of crosslinks in the presence of moisture. Among these polymers, curable compositions containing polymers having polyoxypropylene main chain skeletons are liquid at room temperature and cure into materials having rubber elasticity. Thus, they are widely used as building sealants (refer to patent document 1 and patent document 2 below).

Among various requirements and demands for curable compositions for building applications, dynamic durability is important for sealants for working joint applications.

In the United States, silicone sealants are well known as durable sealants. The durability of the silicone sealants is classified as CLASS 100/50 according to the standard of American Society for Testing and Materials (ASTM) C920, wherein 100 denotes 100% elongation and 50 denotes 50% compression. The classification, "CLASS 100/50" is the highest rating given for dynamic durability. No sealant is recognized as being highly durable sealants unless the sealant has sufficient performance that passes this durability test.

The durability test for ASTM C920 is carried out according to a test method set forth in ASTM C719, the Hockman cycle. According to an established theory of material designing, materials other than silicone rarely achieve the required high recovery ratio.

Curable compositions containing polymers having reactive silicon groups and polyoxypropylene main chain skeletons have sufficient sealant properties such as workability and adhesiveness; however, they have lower recovery ratios compared to that of silicone sealants. Thus, such compositions have been considered difficult to pass the CLASS 100/50 dynamic fatigue testing according to ASTM C719. Furthermore, attempts have been made to search for compositions that can pass CLASS 100/50 dynamic fatigue testing, but no such technique has been found so far.

[Patent Document 1] Japanese Unexamined Patent Application Publication No. 5-125272

[Patent Document 2] Japanese Unexamined Patent Application Publication No. 3-072527

DISCLOSURE OF INVENTION

Under the above-described circumstances, the present inventor have conducted research for finding a sealant having improved dynamic durability that can pass the CLASS 100/50 dynamic fatigue test of ASTM C719 using a polymer having a reactive silicon group and an oxyalkylene main chain skeleton.

The present inventor have found that a curable composition containing a reactive silicon group-containing oxyalkylene polymer whose molecular weight and functional group-introduction ratio are controlled within particular ranges can maintain the same conventional sealing properties and still pass the CLASS 100/50 dynamic fatigue test of ASTM C719 despite its low recovery ratio. The present invention is made based on this finding.

In other words, the present invention provides a sealant having improved dynamic durability, the sealant containing an oxyalkylene polymer (A) having a number-average molecular weight of 20,000 to 50,000 and 0.8 or more of reactive silicon groups per molecule on average; 10 parts by weight or more of a plasticizer (B) per 100 parts by weight of the polymer (A); a filler (C); and a curing catalyst (D).

The sealant of the present invention is suitable as a building sealant, has excellent dynamic durability, maintains desirable mechanical properties, such as low modulus and high elongation, and achieves satisfactory workability.

BEST MODE FOR CARRYING OUT THE INVENTION

The main chain structure of the oxyalkylene polymer (A) (the component (A)) having a number-average molecular weight of 20,000 to 50,000 and 0.8 or more of reactive silicon groups per molecule on average may be any polymer having —R—O— repeating units. Here, R represents a divalent alkylene group having 1 to 20 carbon atoms. The polymer may be a homopolymer having only one type of repeating unit or a copolymer having a plurality of types of repeating units. Furthermore, the main chain of the polymer may contain a branched structure.

Examples of R include —$CH_2CH_2$—, —$CH(CH_3)CH_2$—, —$CH(C_2H_5)CH_2$—, —$C(CH_3)_2CH_2$—, and —$CH_2CH_2CH_2CH_2$—. For sealant applications, a polymer containing —$CH(CH_3)CH_2$— as a main component is preferable since such a polymer is amorphous and has a relatively low viscosity.

For example, the main chain skeleton of the oxyalkylene polymer, i.e., the component (A), is obtained by ring-opening polymerization of monoepoxide in the presence of an initiator and a catalyst.

Examples of the initiator include dihydric or higher alcohols such as ethylene glycol, propylene glycol, butanediol, hexamethylene glycol, methallyl alcohol, bisphenol A, hydrogenated bisphenol A, neopentyl glycol, polybutadiene diol, diethylene glycol, triethylene glycol, polyethylene glycol, polypropylene glycol, polypropylene triol, polypropylene tetraol, dipropylene glycol, glycerin, trimethylol methane, trimethylol propane, and pentaerythritol; and various oligomers having hydroxyl groups.

Examples of the monoepoxide include alkylene oxides such as ethylene oxide, propylene oxide, α-butylene oxide, β-butylene oxide, hexene oxide, cyclohexene oxide, styrene oxide, and α-methylstyrene oxide; alkyl glycidyl ethers such as methyl glycidyl ether, ethyl glycidyl ether, isopropyl glycidyl ether, and butyl glycidyl ether; allyl glycidyl ethers; and aryl glycidyl ethers.

A known catalyst, e.g., an alkali catalyst such as KOH, NaOH, or CsOH, an acidic catalyst, such as trifluoroborane-etherate, or a double metal cyanide complex catalyst, such as an aluminum-porphyrin metal complex or a zinc cobalt cyanide-glyme complex catalyst, is used as the catalyst. In particular, double metal cyanide complex catalysts are preferable since they cause fewer side reactions and yield a product with smaller Mw/Mn and lower viscosity, thus achieving sufficient workability; however, the catalyst is not limited to these.

Alternatively, the main chain skeleton of the oxyalkylene polymer may be obtained by elongation reaction between a hydroxyl-terminated oxyalkylene polymer and a bifunctional or higher functional alkyl halide, such as $CH_2Cl_2$ or $CH_2Br_2$, in the presence of a basic compound such as KOH, NaOH, $KOCH_3$, or $NaOCH_3$.

The number-average molecular weight of the oxyalkylene polymer is preferably in the range of 20,000 to 50,000 in terms of polystyrene by GPC. At a number-average molecular weight of less than 20,000, the cured products tend to be brittle. At a number-average molecular weight exceeding 50,000, the viscosity may be excessively high, handling may become difficult, and thus the workability may be reduced. The number-average molecular weight is more preferably in the range of 20,000 to 40,000 and most preferably in the range of 20,000 to 30,000 to yield desirable mechanical properties and ensure sufficient workability.

The main chain skeleton of the component (A) may contain components other than oxyalkylene in amounts that do not significantly decrease the effects of the present invention. An example of such a component is a urethane bond-containing component.

The urethane bond-containing component is not particularly limited. Examples thereof include derivatives from the reaction between a polyol having the main chain skeleton described above and a polyisocyanate compound, e.g., an aromatic polyisocyanate, such as toluene(tolylene) diisocyanate, diphenylmethane diisocyanate, or xylylene diisocyanate, or an aliphatic polyisocyanate such as isophorone diisocyanate or hexamethylene diisocyanate.

The reactive silicon group contained in the component (A) has a hydroxyl or hydrolyzable group bonded to a silicon atom and forms a siloxane bond by silanol condensation reaction, thereby forming crosslinks. A silanol condensation catalyst may be used to accelerate the silanol condensation reaction.

Examples of the reactive silicon group are functional groups represented by general formula (1):

$$—(SiR^1{}_{2-b}X_bO)_m—SiR^2{}_{3-a}X_a \qquad (1)$$

(wherein $R^1$ and $R^2$ each represent an alkyl group having 1 to 20 carbon atoms, an aryl group having 6 to 20 carbon atoms, an aralkyl group having 7 to 20 carbon atoms, or a triorganosiloxy group represented by $(R')_3SiO—$ and may be the same or different; when two or more $R^1$ or $R^2$ are present, they may be the same or different; R' represents a monovalent hydrocarbon group having 1 to 20 carbon atoms or an aryl group having 6 to 20 carbon atoms, and three R's may be the same or different; X represents a hydroxyl group or a hydrolyzable group, and when two or more Xs are present, they may be the same or different; a represents 0, 1, 2, or 3; b represents 0, 1, or 2; bs in m $(SiR^1{}_{2-b}X_bO)$ groups may be the same or different; m represents an integer of 0 to 19; and the relationship $a+\Sigma b \geq 1$ is satisfied).

The hydrolyzable group is not particularly limited and may be any hydrolyzable group known in the art. Examples thereof include a hydrogen atom, a halogen atom, an alkoxy group, an acyloxy group, a ketoximate group, an amino group, an amide group, an aminooxy group, a mercapto group, and an alkenyloxy group. Among these, a hydrogen atom, an alkoxy group, an acyloxy group, a ketoximate group, an amino group, an amide group, an aminooxy group, a mercapto group, and alkenyloxy group are preferred, and an alkoxy group is particularly preferred since it has moderate hydrolyzability and is easy to handle.

One to three hydrolyzable or hydroxyl groups can bond to one silicon atom. Preferably, $(a+\Sigma b)$ is in the range of 1 to 5. When two or more hydrolyzable or hydroxyl groups are bonded in the reactive silicon group, they may be the same or different.

Reactive silicon groups represented by general formula (2) are preferred due to their ready availability:

$$—SiR^2{}_{3-a}X_a \qquad (2)$$

(wherein $R^2$ and X are the same as above; and a represents an integer of 1 to 3).

Examples of $R^1$ and $R^2$ in above-described general formulae (1) and (2) include alkyl groups such as a methyl group and an ethyl group; cycloalkyl groups such as a cyclohexyl group; aryl groups such as a phenyl group; aralkyl groups, such as a benzyl group; and a triorganosiloxy group represented by $(R')_3SiO—$ wherein R' represents a methyl group or a phenyl group. Among these, a methyl group is particularly preferred.

More specific examples of the reactive silicon group include a trimethoxysilyl group, a triethoxysilyl group, a triisopropoxysilyl group, a dimethoxymethylsilyl group, a diethoxymethylsilyl group, and a diisopropoxymethylsilyl group.

Introduction of the reactive silicon group may be carried out according to a known technique. Examples of such a technique are as follows:

(I) An oxyalkylene polymer having a functional group, such as hydroxyl, in a molecule is reacted with an organic compound having an unsaturated group and an active group reactive to that functional group to yield an oxyalkylene polymer containing an unsaturated group. Alternatively, a monomer having an unsaturated group not contributing to the polymerization reaction may be copolymerized to yield an unsaturated group-containing oxyalkylene polymer. For example, in the process of synthesizing an oxyalkylene polymer by ring-opening polymerization of an epoxide, an unsaturated group-containing epoxide may be used to yield an unsaturated group-containing oxyalkylene polymer by ring-opening copolymerization. Then, the reaction product is reacted with a hydrosilane containing a reactive silicon group to achieve hydrosilylation.

(II) An oxyalkylene polymer having an unsaturated group prepared by the same method as in (I) is reacted with a compound having a mercapto group and a reactive silicon group.

(III) An oxyalkylene polymer having a functional group, e.g., a hydroxyl, epoxy, or isocyanate group, in a molecule is reacted with a compound having a functional group reactive to the functional group of the polymer and a reactive silicon group.

Among these techniques, the technique in (I) and the technique of reacting a hydroxyl-terminated polymer with a compound having an isocyanate group and a reactive silicon group set forth in (III) are preferable since high conversion can be achieved in a relatively short reaction time. Furthermore, the oxyalkylene polymer having a reactive silicon group obtained in the technique set forth in (I) can yield a curable composition having lower viscosity and higher workability compared to the polymer obtained by the technique set forth in (III). Moreover, the polymer obtained by the technique in (II) has an acute odor derived from mercaptosilane. Thus, the technique set forth in (I) is particularly preferred.

Examples of the hydrosilane compound used in the technique set forth in (I) include, but are not limited to, halosilanes such as trichlorosilane, methyldichlorosilane, dimethylchlorosilane, and phenyldichlorosilane; alkoxy silanes such as trimethoxysilane, triethoxysilane, methyldiethoxysilane, methyldimethoxysilane, and phenyldimethoxysilane; acyloxysilanes such as methyldiacetoxysilane and phenyldiacetoxysilane; and ketoximate silanes such as bis(dimethylketoximate)methylsilane and bis(cyclohexylketoximate) methylsilane. Among these, halosilanes and alkoxysilanes are preferable. Alkoxysilanes are most preferable since the resulting curable composition has moderate hydrolyzability and is easy to handle.

The hydrosilylation reaction is preferably conducted in the presence of a Group VIII transition metal catalyst.

The Group VIII transition metal catalyst is preferably a complex catalyst of a metal selected from the Group VIII elements such as platinum, rhodium, cobalt, palladium, and nickel. For example, compounds such as $H_2PtCl_6 \cdot 6H_2O$, a platinum-vinylsiloxane complex, a platinum-olefin complex, metallic platinum, $RhCl(PPh_3)_3$, $RhCl_3$, $Rh/Al_2O_3$, $RuCl_3$, $IrCl_3$, $FeCl_3$, $PdCl_2 \cdot 2H_2O$, and $NiCl_2$ may be used. From the standpoint of reactivity in hydrosilylation, $H_2PtCl_6 \cdot 6H_2O$, a platinum-vinylsiloxane complex, and a platinum-olefin complex are particularly preferable.

The hydrosilylation is carried out usually at 10° C. to 150° C., preferably at 20° C. to 120° C., and more preferably at 40° C. to 100° C. Depending on the need, i.e., in order to control the reaction temperature, the viscosity of the reaction system, or the like, a solvent, such as benzene, toluene, xylene, tetrahydrofuran, methylene chloride, pentane, hexane, or heptane may be used.

Other examples of the hydrosilylation catalyst include $AlCl_3$ and $TiCl_4$.

The amount of the hydrosilylation catalyst used is not particularly limited. Usually, it is preferable to use $10^{-1}$ to $10^{-8}$ mol and more preferably $10^{-3}$ to $10^{-6}$ mol of a platinum catalyst per mole of alkenyl group. When the amount of the catalyst is small, hydrosilylation reaction may not proceed sufficiently. When the amount of the catalyst is large, the cost increases due to consumption of the catalyst, and the amount of the catalyst remaining in the product increases.

In order to accelerate hydrosilylation reaction, a technique such as reactivation of the catalyst using oxygen (Japanese Unexamined Patent Application Publication No. 8-283339) or addition of sulfur may be employed.

In order to suppress oxidation of the oxyalkylene polymer, the reaction solvent, and the like, the hydrosilylation may be performed in the presence of an antioxidant.

An example of the synthetic technique set forth in (II) is a method of introducing a compound having a mercapto group and a reactive silicon group into an unsaturated bonding site of the oxyalkylene polymer by radical addition reaction in the presence of a radical initiator and/or a radical generating source; however, the technique is not particularly limited. Examples of the compound having the mercapto group and the reactive silicon group include, but are not limited to, γ-mercaptopropyltrimethoxysilane, γ-mercaptopropylmethyldimethoxysilane, γ-mercaptopropyltriethoxysilane, and γ-mercaptopropylmethyldiethoxysilane.

Among the synthetic techniques set forth in (III), the technique of reacting a hydroxyl-terminated polymer with a compound having isocyanate and reactive silicon groups is, for example, set forth in Japanese Unexamined Patent Application Publication No. 3-47825. However, the technique is not particularly limited to this. Examples of the compound having the isocyanate and reactive silicon groups include, but are not limited to, γ-isocyanatopropyltrimethoxysilane, γ-isocyanatopropylmethyldimethoxysilane, γ-isocyanatopropyltriethoxysilane, and γ-isocyanatopropylmethyldiethoxysilane.

The polymer (A) may be straight or branched.

The oxyalkylene polymer may contain a reactive silicon group at an end or inside the molecular chain. Alternatively, the oxyalkylene polymer may contain a plurality of reactive silicon groups at ends and in the molecular chain. In particular, when reactive silicon groups are located at molecular ends only, the number of effective crosslinks of the polymer component contained in the final cured product can be increased, and a high-strength, high-elongation rubber cured product can be easily obtained as a result.

Examples of the method for making the oxyalkylene polymer (A) having a number-average molecular weight of 20,000 to 50,000 and 0.8 or more of reactive silicon groups per molecule on average include, but are not limited to, methods of preparing high-molecular weight, narrow molecular weight distribution oxyalkylene polymers having a number-average molecular weight of 6,000 or more and Mw/Mn of 1.6 or less disclosed in Japanese Unexamined Patent Application Publication Nos. 50-156599, 54-6096, 55-13767, 5-117521, 5-125272, 61-197631, 61-215622, 61-215623, 3-72527, and 8-231707.

The reactive silicon group-containing oxyalkylene polymers mentioned above may be used alone or in combination.

There are various methods for determining the introduction ratio of the reactive silicon groups. An accurate measurement can be conducted from $^1$H-NMR spectra by comparing the integrated values of the ends into which reactive silicon groups are introduced and of the ends into which no reactive silicon group is introduced.

In the present invention, a modified product of the oxyalkylene polymer (A) having a number-average molecular weight of 20,000 to 50,000 and 0.8 or more of reactive silicon groups per molecule on average may also be used.

A typical example of the modified product is a product prepared by polymerizing at least one of an alkyl (meth) acrylate monomer containing a $C_1$-$C_9$ alkyl group and being represented by general formula (3) below, an acryl (meth) acrylate monomer containing an alkyl group having 10 or more carbon atoms and being represented by general formula (4) below, and a reactive silicon group-containing alkyl (meth)acrylate monomer represented by general formula (5) below in the presence of the reactive silicon group-containing oxyalkylene polymer and/or a solvent:

$$CH_2=C(R^3)COOR^4 \quad (3)$$

(wherein $R^3$ represents a hydrogen atom or a methyl group; and $R^4$ represents a $C_1$-$C_9$ alkyl group);

$$CH_2=C(R^3)COOR^5 \quad (4)$$

(wherein $R^3$ is the same as above, and $R^5$ represents an alkyl group having 10 or more carbon atoms); and

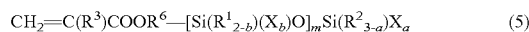

$$CH_2=C(R^3)COOR^6-[Si(R^1_{2-b})(X_b)O]_mSi(R^2_{3-a})X_a \quad (5)$$

(wherein $R^3$ is the same as above; $R^6$ represents a $C_1$-$C_6$ divalent alkylene group; and $R^1$, $R^2$, X, a, b, and m are the same as those in formula (1)). Alternatively, a mixture of a polymer (3), (4), and (5) and the reactive silicon group-containing oxyalkylene polymer may be used.

Examples of $R^4$ in general formula (3) above include $C_1$-$C_8$ alkyl groups such as a methyl group, an ethyl group, a propyl group, an n-butyl group, a tert-butyl group, and a 2-ethylhexyl group. $C_1$-$C_4$ alkyl groups are more preferred, and $C_1$-$C_2$ alkyl groups are most preferred. One or more types of monomer represented by general formula (3) may be used.

Examples of $R^5$ in general formula (4) include long-chain alkyl groups having 10 or more carbon atoms, such as a lauryl group, a tridecyl group, a cetyl group, a stearyl group, and a biphenyl group. Long-chain alkyl groups having 10 to 30 carbon atoms are typically used, but long-chain alkyl groups having 10 to 20 carbon atoms are preferred. One or more types of monomer represented by general formula (4) may be used.

Examples of $R^6$ in general formula (5) include $C_1$-$C_6$ alkylene groups such as methylene, ethylene, propylene groups. $C_1$-$C_4$ alkylene groups are more preferred. Examples of the reactive silicon group bonded to $R^6$ include trimethoxysilyl, methyldimethoxysilyl, triethoxysilyl, and methyldiethoxysilyl groups. One or more types of monomer represented by general formula (5) may be used.

Monomers other than (3), (4), and (5) above may be used in addition during the polymerization. Examples of such monomers include acrylic monomers such as acrylic acid and methacrylic acid; amide-containing monomers such as acrylamide, methacrylamide, N-methylolacrylamide, and N-methylolmethacrylamide; epoxy-containing monomers, such as glycidyl acrylate and glycidyl methacrylate; amino-containing monomers, such as diethylaminoethyl acrylate, diethylaminoethyl methacrylate, and aminoethyl vinyl ether; and monomers such as acrylonitrile, styrene, α-methylstyrene, alkylvinyl ether, vinyl chloride, vinyl acetate, vinyl propionate, and ethylene. Here, the total amount of the monomers (3), (4), and (5) is preferably 50 wt % or more and more preferably 70 wt % or more of the total of the monomers to be polymerized.

Examples of the plasticizer (B) contained in the curable composition of the present invention include phthalates such as dibutyl phthalate, diheptyl phthalate, di(2-ethylhexyl) phthalate, butylbenzyl phthalate, and butyl-phthalyl-butyl glycolate; nonaromatic dibasic acid esters such as dioctyl adipate and dioctyl sebacate; phosphates such as tricresyl phosphate and tributyl phosphate; hydrocarbon plasticizers such as polybutene, polybutadiene, and nonreactive polyisobutylene; phenyl alkylsulfonates such as Mesamoll and Mesamoll II produced by Bayer; epoxy plasticizers such as epoxidized soybean oil and epoxidized linseed oil; and alkylaryl sulfonamides.

Polymeric plasticizers may also be used. By using polymeric plasticizers, the original properties can be maintained over a long term compared to when low molecular weight plasticizers containing no polymeric component in molecules are used. Examples of the polymeric plasticizers include, but are not limited to, vinyl polymers prepared by various methods of polymerizing vinyl monomers; polyalkylene glycol esters such as diethylene glycol dibenzoate, triethylene glycol dibenzoate, and pentaerythritol esters; polyester plasticizers prepared from a dibasic acid, such as sebacic acid, adipic acid, azelaic acid, or phthalic acid, and a dihydric alcohol such as ethylene glycol, diethylene glycol, triethylene glycol, propylene glycol, and dipropylene glycol; polyethers such as polyetherpolyols, e.g., polyethylene glycol, polypropylene glycol, and polytetramethylene glycol, having a molecular weight of 500 or more and preferably 1,000 or more and derivatives obtained by converting hydroxyl groups of these polyetherpolyols to ester groups, ether groups, or the like; polystyrenes such as polystyrene and poly-α-methylstyrene; polybutadiene; polybutene; polyisobutylene; butadiene-acrylonitrile; and polychloroprene.

These plasticizers may be used alone or in combination.

Preferably, more than 10 parts by weight of the plasticizer is used per 100 parts by weight of the reactive silicon group-containing oxyalkylene polymer (A). At a plasticizer content of 10 parts by weight or less, the workability as sealants is difficult to maintain. At a plasticizer content exceeding 300 parts by weight, the durability of the cured products tends to be low. Thus, the plasticizer content is preferably 300 parts by weight or less.

The filler (C) in the present invention is not limited to a particular filler. Examples of the filler include reinforcing fillers such as fumed silica, precipitated silica, silicic anhydride, hydrous silicic acid, and carbon black; fillers such as calcium carbonate, magnesium carbonate, calcium oxide, calcium hydroxide, diatomaceous earth, calcined clay, clay, talc, titanium oxide, bentonite, organic bentonite, ferric oxide, zinc oxide, and activated zinc oxide, and organic fillers such as hydrogenated castor oil, PVC, and polyolefin; fibrous fillers such as asbestos, glass fibers, and filaments; inorganic balloon such as shirasu balloon, glass balloon, saran balloon, and phenol balloon, and organic balloon. One or more types of filler may be selected as necessary. Preferably, 1 to 200 parts by weight and more preferably 5 to 200 parts by weight of the filler is contained per 100 parts by weight of the reactive silicon group-containing oxyalkylene polymer.

When calcium carbonate is to be used as a filler, it is preferable to use a combination of surface-treated fine calcium carbonate and coarse calcium carbonate, such as heavy calcium carbonate. The particle size of the surface-treated fine calcium carbonate is preferably 0.5 μm or less. The surface-treated calcium carbonate is preferably treated with a fatty acid or fatty acid salt. The particle size of the coarse calcium carbonate is preferably 1 μm or more. The coarse calcium carbonate may be used without surface treatment.

In order to improve the workability (threading) of the composition and to form a cured product with matt-finished surfaces, it is preferable to add organic balloon and/or inorganic balloon. These fillers may be surface-treated and may be used alone or in combination.

By using balloon (preferably having an average particle size of 0.1 mm or more), a sanded or sandstone-like rough surface can be produced while achieving weight reduction. Preferable particle size, amounts, raw materials of balloon, and the like are disclosed in Japanese Unexamined Patent Application Publication No. 10-251618.

The balloon may be used together with an anti-slip agent as disclosed in Japanese Unexamined Patent Application Publication No. 2000-154368 and/or an amine compound, in particular, a primary and/or secondary amine having a melting point of 35° C. or more, to produce a cured product having an irregular and matt surface, as disclosed in Japanese Unexamined Patent Application Publication No. 2001-164237.

Examples of the balloon are disclosed in Japanese Unexamined Patent Application Publication Nos. 2-129262, 4-8788, 4-173867, 5-1225, 7-113073, 9-53063, 10-251618, 2000-154368, and 2001-164237, and International Publication WO97/05201.

In order to impart a high elongation property, a compound having an α,β-diol or α,γ-diol structure described in Japanese Unexamined Patent Application Publication No. 11-080533 may be added.

The curing catalyst (D) of the present invention may be any curing catalyst that can promote the reaction of the reactive group in the reactive silicon group-containing oxyalkylene polymer (A).

Examples of such a catalyst include silanol condensation catalysts. Examples of the silanol condensation catalysts include titanium compounds such as tetrabutyl titanate, tetrapropyl titanate, and titanium tetraacetyl acetonate; tetravalent tin compounds such as dibutyltin dilaurate, dibutyltin maleate, dibutyltin phthalate, dibutyltin dioctoate, dibutyltin diethylhexanoate, dibutyltin dimethylmaleate, dibutyltin diethylmaleate, dibutyltin dibutylmaleate, dibutyltin dioctylmaleate, dibutyltin ditridecylmaleate, dibutyltin dibenzylmaleate, dibutyltin diacetate, dioctyltin diethylmaleate, dioctyltin dioctylmaleate, dibutyltin dimethoxide, dibutyltin dinonylphenoxide, dibutenyltin oxide, dibutyltin diacetylacetonate, dibutyltin diethylacetoacetonate, and reaction products of dibutyltin oxide and phthalic esters; divalent tin compounds such as tin octylate, tin naphthenate, tin stearate, and tin versatate; organoaluminum compounds such as aluminum trisacetyl acetonate, aluminum trisethyl acetoacetate, and diisopropoxyaluminum ethylacetoacetate; zirconium compounds such as zirconium tetraacetyl acetonate; lead octylate; amine compounds such as butylamine, octylamine, dibutylamine, monoethanolamine, diethanolamine, triethanolamine, diethylenetriamine, triethylenetetramine, oleylamine, laurylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazol, 1,8-diazabicyclo(5,4,0)undec-7-ene (DBU), and N,N-diethylpropanediamine and salts of these amine compounds with carboxylic acid or the like; low-molecular-weight polyamide resins obtained from excess polyamine and polybasic acids; reaction products between excess polyamine and epoxy compounds; and amino-containing silane coupling agents such as γ-aminopropyltrimethoxysilane, and N-(β-aminoethyl)aminopropylmethyldimethoxysilane. Other known silanol condensation catalysts, such as acidic catalysts and basic catalysts, may also be used. These catalysts may be used alone or in combination.

Preferably, about 0.01 to 20 parts by weight and more preferably 0.1 to 10 parts by weight of the curing catalyst is used per 100 parts by weight of the reactive silicon group-containing oxyalkylene polymer.

When the amount of the curing catalyst is excessively small, curing rate is decreased, and curing reaction does not proceed sufficiently. When the amount of the curing catalyst is excessively large, heat and foam are locally generated during curing, and a product having satisfactory quality is rarely produced.

The curable composition of the present invention may contain an adhesion promoter, a solvent, and other additives according to the need.

Examples of the adhesion promoter include silane coupling agents, reaction products of silane coupling agents, and compounds other than silane coupling agents. Examples of the silane coupling agents include isocyanate-containing silanes such as γ-isocyanatopropyltrimethoxysilane, γ-isocyanatopropyltriethoxysilane, γ-isocyanatopropylmethyldiethoxysilane, and γ-isocyanatopropylmethyldimethoxysilane; amino-containing silanes such as γ-aminopropyltrimethoxysilane, γ-aminopropyltriethoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-ureidopropyltrimethoxysilane, N-phenyl-γ-aminopropyltrimethoxysilane, N-benzyl-γ-aminopropyltrimethoxysilane, and N-vinylbenzyl-γ-aminopropyltriethoxysilane; mercapto-containing silanes such as γ-mercaptopropyltrimethoxysilane, γ-mercaptopropyltriethoxysilane, γ-mercaptopropylmethyldimethoxysilane, and γ-mercaptopropylmethyldiethoxysilane; epoxy-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxysilanes such as β-carboxyethyltriethoxysilane, β-carboxyethylphenylbis(2-methoxyethoxy)silane, and N-β-(carboxymethyl)aminoethyl-γ-aminopropyltrimethoxysilane; vinyl unsaturated group-containing silanes such as vinyltrimethoxysilane, vinyltriethoxysilane, γ-methacryloyloxypropylmethyldimethoxysilane, and γ-acryloyloxypropylmethyltriethoxysilane; halogen-containing silanes such as γ-chloropropyltrimethoxysilane; and isocyanuratesilanes such as tris(trimethoxysilyl) isocyanurate. Moreover, derivatives produced by modifying these substances, such as amino-modified silyl polymers, silylated amino polymers, unsaturated aminosilane complexes, phenylamino long-chain alkylsilane, aminosilylated silicone, and silylated polyesters, may also be used as silane coupling agents. In the present invention, 0.1 to 20 parts by weight of the silane coupling agent is usually used per 100 parts by weight of the reactive silicon group-containing oxypropylene polymer (A). Preferably, the content of the silane coupling content is in the range of 0.5 to 10 parts by weight.

The silane coupling agent added to the curable composition of the present invention significantly improves the adhesiveness of the composition to various adherends, e.g., inorganic substrates such as glass, aluminum, stainless steel, zinc, copper, and mortar substrates and organic substrates such as of poly vinyl chloride, polyacrylate, polyester, polyethylene, polypropylene, and polycarbonate substrates, with or without primer treatment. When the silane coupling agent is used without primer treatment, its effect of improving the adhesiveness to various adherends is particularly notable. Examples of the adhesion promoter other than silane coupling agents include, but are not limited to, epoxy resin, phenol resin, sulfur, alkyl titanates, and aromatic polyisocyanate. These adhesion promoters may be used alone or in combination. By adding these adhesion promoters, the adhesiveness to the adherends can be improved.

Examples of the solvent include nonreactive solvents such as hydrocarbons, acetates, alcohols, ethers, and ketones. The solvent may be any solvent of this type and is not particularly limited.

Examples of other additives include an anti-sagging agent, a coloring agent, a photocurable substance, an anti-oxidant, a photostabilizer, and a UV absorber. If necessary, an oxygen-curable substance that forms hard coating near the surface of the cured product by the reaction with oxygen in air may be added to eliminate stickiness in the surface and to prevent adhesion of contaminants and dust onto the surface of the cured product.

Examples of the anti-sagging agent include polyamide waxes; hydrogenated castor oil derivatives; and metal soaps such as calcium stearate, aluminum stearate, and barium stearate. These anti-sagging agents, i.e., thixotrope, may be used alone or in combination. The thixotropy-imparting agents is used in an amount of 0.1 to 20 parts by weight per 100 parts by weight of the reactive silicon group-containing oxypropylene polymer (A).

When the photocurable substance is used, the surface of the cured product is covered with a coating of the photocurable substance. Thus, the stickiness and the weather resistance of the cured product can be improved. A "photocurable substance" changes its properties, e.g., undergoes curing, as a result of chemical changes in molecular structure caused by light in a significantly short time. Examples of this type of compound include organic monomers, oligomers, resins, and compositions containing these; and a desired commercially available compound may be employed. Typical examples are unsaturated acrylic compounds, polyvinyl cinnamates, and azide-treated resins. Examples of the unsaturated acrylic compounds include monomers and oligomers having one or more acrylic or methacrylic unsaturated groups and mixtures of these monomers and oligomers. In particular, monomers such as propylene (or butylene or ethylene)glycol di(meth)acrylate and neopentyl glycol di(meth)acrylate, and oligoesters having a molecular weight of 10,000 or less may be used. Specific examples thereof include bifunctional special acrylates such as Aronix M-210, Aronix M-215, Aronix M-220, Aronix M-233, Aronix M-240, and Aronix M-245; trifunctional acrylates such as Aronix M-305, Aronix M-309, Aronix M-310, Aronix M-315, Aronix M-320, and Aronix M-325; and polyfunctional acrylates such as Aronix M-400. In particular, acryl-containing compounds are preferable. Compounds having three or more acryl functional groups per molecule on average are particularly preferable. The Aronix's described above are products of Toagosei Chemical Industry Co., Ltd.

Examples of the polyvinyl cinnamates include photosensitive resins that have a cinnamoyl group as a photosensitive group and are obtained by esterification of polyvinyl alcohol with cinnamic acid, and a large number of polyvinyl cinnamic acid derivatives. The azide-treated resins are photosensitive resins having an azide group as the photosensitive group. Examples of the azide-treated resins include rubber photosensitive solutions containing diazide compounds as sensitizers and those specifically disclosed in "Kankosei Jushi (Photosensitive Resins)" (published Mar. 17, 1972, by Insatsu Gakkai Shuppannbu, pp. 93-, 106-, and 117-). Usually, these azide-treated resins are used alone or in combination. An intensifier, such as a ketone or a nitro compound, and/or an accelerator, such as an amine, may be used to yield further advantages. Preferably, 0.1 to 20 parts by weight and more preferably 0.5 to 10 parts by weight of the photocurable substance is used per 100 parts by weight of the reactive silicon group-containing oxypropylene polymer (A). At 0.1 part by weight or less, the weather resistance is not improved. At 20 parts by weight or more, the cured product becomes too hard and cracks.

Examples of the antioxidant include hindered phenol compounds, monophenol compounds, bisphenol compounds, and polyphenol compounds. Hindered phenol compounds are particularly preferable. Japanese Unexamined Patent Application Publication Nos. 4-283259 and 9-194731 also provide examples thereof. Hindered amine photostabilizers such as Tinuvin 622LD, Tinuvin 144, CHIMASSORB 944LD, and CHIMASSORB 119FL produced by Japan Ciba-Geigy Ltd.; MARK LA-57, MARK LA-62, MARK LA-67, MARK LA-63, and MARK LA-68 produced by Adeka Argus Chemical Co.; and Sanol LS-770, Sanol LS-765, Sanol LS-292, Sanol LS-2626, Sanol LS-1114, and Sanol LS-744 produced by Sankyo Co., Ltd. may be used. Preferably, 0.1 to 10 parts by weight and more preferably 0.2 to 5 parts by weight of the antioxidant is used per 100 parts by weight of the reactive silicon group-containing oxypropylene polymer (A).

Examples of the photostabilizer include benzotriazol compounds, hindered amine compounds, and benzoate compounds. Hindered amine compounds are particularly preferable. Preferably, 0.1 to 10 parts by weight, and more preferably 0.2 to 5 parts by weight of the photostabilizer is used per 100 parts by weight of the reactive silicon group-containing oxypropylene polymer (A). Specific examples of the photostabilizer are disclosed in Japanese Unexamined Patent Application Publication No. 9-194731.

Examples of the UV absorber include benzophenone compounds, benzotriazole compounds, salicylate compounds, substituted tolyl compounds, and metal chelate compounds. Benzotriazole compounds are particularly preferable. Preferably, 0.1 to 10 parts by weight and more preferably 0.2 to 5 parts by weight of the UV absorber is used per 100 parts by weight of the reactive silicon group-containing oxypropylene polymer (A). It is preferable to use a combination of a phenol or hindered phenol antioxidant, a hindered amine photostabilizer, and a benzotriazole UV absorber.

Examples of the oxygen-curable substance include liquid polymers, liquid copolymers, and their derivatives such as maleated derivatives and boiled oil-modified products. Examples of the liquid polymers include drying oils such as tung oil and linseed oil and various alkyd resins obtained by modifying these compounds; acryl polymers, epoxy resins, and silicone resins modified with drying oils; and polymers such as 1,2-polybutadiene, 1,4-polybutadiene, and $C_5$-$C_8$ diene obtained by polymerization or copolymerization of diene compounds, such as butadiene, chloroprene, isoprene, and 1,3-pentadiene. Examples of the liquid copolymers include copolymers, such as NBR and SBR, obtained by copolymerizing these diene compounds and monomers, such as acrylonitrile and styrene, copolymerizable with the diene compounds so that the diene compounds are the main component. In some cases, the oxygen-curable substance shows increased effects when used in combination with a catalyst that accelerates oxygen curing or a metal drier. Examples of such catalyst and metal drier include metal salts such as cobalt naphthenate, lead naphthenate, zirconium naphthenate, cobalt octylate, and zirconium octylate; and amine compounds.

The composition of the present invention may contain a compound containing an epoxy group in a molecule. Epoxy-containing compounds can increase the recovery ratio of the cured product. Examples of the epoxy-containing compounds include epoxidized unsaturated fats and oils; epoxidized unsaturated fatty esters, alicyclic epoxidized compounds, epichlorohydrin derivatives, and mixtures of these. In particular, epoxidized soy bean oil, epoxidized linseed oil, di-(2-ethylhexyl)4,5-epoxycyclohexane-1,2-dicarboxylate (E-PS), epoxy octyl stearate, and epoxy butyl stearate can be used. Among these, E-PS is particularly preferable. Preferably, 0.5 to 50 parts by weight of the epoxy compound is used per 100 parts by weight of reactive silicon group-containing oxypropylene polymer (A).

If necessary, various additives may be added to the curable compositions of the present invention to adjust various properties of the curable composition or the cured product. Examples of such additives include an adhesion improver, a tackifier, a storage stability improver, a flame retarder, a curing speed adjustor, a radical inhibitor, a metal deactivator, an antiozonant, a phosphorus-based peroxide decomposer, a lubricant, a pigment, a foaming agent, a solvent, and a fungicide. These additives may be used alone or in combination. Examples of additives other than these are disclosed in Japanese Examined Patent Application Publication Nos. 4-69659 and 7-108928 and Japanese Unexamined Patent Application Publication Nos. 63-254149, 64-22904 and 2001-72854.

The inventive curable composition containing the reactive silicon group-containing oxyalkylene polymer, i.e., the component (A), the component (B), and the component (C) may be produced by any method. For example, a typical method, e.g., a method of kneading a mixture of these components using a mixer, rollers, or a kneader or a method of dissolving the components in solvents and then mixing the components, may be employed. The composition may be a one-component composition or two-component composition.

When the curable composition is of a one-component type, all the ingredients are mixed in advance. Thus, ingredients containing water are preferably dehydrated and dried before use; alternatively, dehydration is preferably performed during mixing by reducing pressure or the like. When the curable composition is of a two-component type, there is no need to add a curing catalyst to the main component containing the reactive silicon group-containing oxyalkylene polymer; thus, the possibility of gelation is weak even when moderate amounts of water is contained in the mixture. However, when long-term storage stability is required, dehydration and drying are preferably conducted. When the ingredients are solid, e.g., powder, the dehydration and drying are preferably conducted by heating. When the ingredients are liquid, vacuum dehydration or dehydration using synthetic zeolite, activated alumina, silica gel, or the like is preferred. Alternatively, dehydration may be conducted by adding a small amount of an isocyanate compound to yield the reaction between the isocyanate group and water. The storage stability is further improved by adding a lower alcohol, such as methanol or ethanol, or an alkoxysilane compound, such as n-propyltrimethoxysilane, vinyltrimethoxysilane, vinylmethyldimethoxysilane, γ-mercaptopropylmethyldimethoxysilane, γ-mercaptopropylmethyldiethoxysilane, or γ-glycidoxypropyltrimethoxysilane in addition to performing the dehydration and drying described above.

Preferably, 0.1 to 20 parts by weight, and more preferably 0.5 to 10 parts by weight of a dehydrator, e.g., a silicon compound, such as vinyltrimethoxysilane, that can react with water, is used per 100 parts by weight of the reactive silicon group-containing polyoxypropylene (A).

EXAMPLES

The curable composition of the present invention will now be described by Examples. Although the invention is specifically described by Synthetic Examples and Examples below, these examples do not limit the scope of the invention.

Synthetic Example 1

Using a polyoxypropylene diol having a number-average molecular weight of 2,000 as an initiator, propylene oxide was polymerized in the presence of a double metal cyanide complex acting as a catalyst to obtain a polyoxypropylene diol having a number-average molecular weight of 37,000 (polystyrene equivalents determined by GPC). After addition of 2 parts by weight of a 30% methanol solution of sodium methylate, the resulting mixture was evaporated under reduced pressure at 130° C. until methanol was no longer collected. To this mixture, 1.3 parts by weight of allyl chloride was added, and the resulting mixture was reacted for 5 hours. Unreacted allyl chloride was then removed by evaporation under reduced pressure. The residue was purified with hexane and water to obtain an oxypropylene polymer (P1) containing about two allyl terminal groups per molecule.

Synthetic Example 2

Using a polyoxypropylene diol having a number-average molecular weight of 2,000 as an initiator, propylene oxide was polymerized in the presence of a double metal cyanide complex acting as a catalyst to obtain a polyoxypropylene diol having a number-average molecular weight of 30,200 (polystyrene equivalents determined by GPC) and a molecular weight distribution of 1.2. After addition of 2.5 parts by weight of a 30% methanol solution of sodium methylate, the resulting mixture was evaporated under reduced pressure at 130° C. until methanol was no longer collected. To this mixture, 1.5 parts by weight of allyl chloride was added, and the resulting mixture was reacted for 5 hours. Unreacted allyl chloride was then removed by evaporation under reduced pressure. The residue was purified with hexane and water to obtain an oxypropylene polymer (P2) containing about two allyl terminal groups per molecule.

Synthetic Example 3

Using a polyoxypropylene diol having a number-average molecular weight of 2,000 as an initiator, propylene oxide was polymerized in the presence of a double metal cyanide complex acting as a catalyst to obtain a polyoxypropylene diol having a number-average molecular weight of 19,000 (polystyrene equivalents determined by GPC) and a molecular weight distribution of 1.1. After addition of 4.2 parts by weight of a 30% methanol solution of sodium methylate, the resulting mixture was evaporated under reduced pressure at 130° C. until methanol was no longer collected. To this mixture, 2.8 parts by weight of allyl chloride was added, and the resulting mixture was reacted for 5 hours. Unreacted allyl chloride was then removed by evaporation under reduced pressure. The residue was purified with hexane and water to obtain an oxypropylene polymer (P3) containing about two allyl terminal groups per molecule.

Synthetic Example 4

A dimethoxymethylsilyl-terminated oxypropylene polymer (P4) was prepared by reacting the polymer P1 prepared as in SYNTHETIC EXAMPLE 1 with 0.65 mol of dimethoxymethylsilane per mole of the allyl group in P1 in the presence of chloroplatinic acid.

Synthetic Example 5

A dimethoxymethylsilyl-terminated oxypropylene polymer (P5) was prepared by reacting the polymer P1 prepared as in SYNTHETIC EXAMPLE 1 with 0.50 mol of dimethoxymethylsilane per mole of the allyl group in P1 in the presence of chloroplatinic acid.

Synthetic Example 6

A dimethoxymethylsilyl-terminated oxypropylene polymer (P6) was prepared by reacting the polymer P1 prepared as in SYNTHETIC EXAMPLE 1 with 0.40 mol of dimethoxymethylsilane per mole of the allyl group in P1 in the presence of chloroplatinic acid.

Synthetic Example 7

A dimethoxymethylsilyl-terminated oxypropylene polymer (P7) was prepared by reacting the polymer P1 prepared as in SYNTHETIC EXAMPLE 1 with 0.30 mol of dimethoxymethylsilane per mole of the allyl group in P1 in the presence of chloroplatinic acid.

Synthetic Example 8

A dimethoxymethylsilyl-terminated oxypropylene polymer (P8) was prepared by reacting the polymer P2 prepared as in SYNTHETIC EXAMPLE 2 with 0.65 mol of dimethoxymethylsilane per mole of the allyl group in P2 in the presence of chloroplatinic acid.

Synthetic Example 9

A dimethoxymethylsilyl-terminated oxypropylene polymer (P9) was prepared by reacting the polymer P3 prepared as in SYNTHETIC EXAMPLE 3 with 0.65 mol of dimethoxymethylsilane per mole of the allyl group in P3 in the presence of chloroplatinic acid.

Synthetic Example 10

Using a polyoxypropylene diol having a number-average molecular weight of 2,000 as an initiator, propylene oxide was polymerized in the presence of a double metal cyanide complex acting as a catalyst to obtain a polyoxypropylene diol having a number-average molecular weight of 37,000 (polystyrene equivalents determined by GPC). Urethanation was performed by adding 0.65 mol of γ-isocyanatopropyl-trimethoxysilane per mole of the hydroxyl group in the obtained polypropylene glycol to obtain a trimethoxysilyl-terminated oxypropylene polymer (P10).

Example 1

A mixture of 100 parts by weight of P4 obtained in SYNTHETIC EXAMPLE 4 as the reactive silicon group-containing oxyalkylene polymer, 60 parts by weight of diisodecyl phthalate as a plasticizer, 120 parts by weight of calcium carbonate as a filler, 1 part by weight of dibutyltin bisacetylacetonate as a curing catalyst, 20 parts by weight of titanium oxide, 2 parts by weight of a polyamide wax, 2 parts by weight of vinyltrimethoxysilane, and 3 parts by weight of N-(β-aminoethyl)-γ-aminopropyltrimethoxysilane was thoroughly kneaded to prepare a one component curable composition. A cartridge was filled with this composition to conduct the following experiments.

--Tensile Test Using Dumbbell-Shaped Specimens--

A sheet 3 mm in thickness was prepared and left to stand at 23° C. and 60% RH for three days to cure. The sheet was then placed in an oven at 50° C. for four days and cooled to room temperature. A Japanese Industrial Standards No. 3 dumbbell specimen was punched out from the sheet. The modulus at 300% elongation (M300) at a tensile rate of 200 mm/min and the elongation at break of this specimen were measured with an universal testing machine.

--Recovery Ratio--

An ASTM C719 test sample was prepared using an aluminum substrate. The sample was subjected to 50% compression at 70° C. for seven days, and the recovery ratio of the sample one day after the sample was placed in an open atmosphere at room temperature was measured.

--ASTM C719 CLASS100/50 Dynamic Durability Test--

(Preparation of Samples)

Each sample was prepared using a mortar substrate and measured at n=3.

A primer for mortar was applied, and then a sealant was applied. The resulting sample was cured (width of the joint=½ inch).

The sample was subjected to 50% compression at 70° C. for a week and then to cycle testing.

(Cycle Testing)

A cycle of 100% elongation and 50% compression was carried out ten times at room temperature to conduct testing (the speed of the moving joint=⅛ inch/hr).

The sample was then subjected to heat cycle testing for 10 cycles (one cycle consisting of 50% compression at 70° C. and 100% elongation at −26° C.).

The sample after testing was observed and evaluated as "pass (indicated as P)" if the area of separation or cohesion failure was 50% or less of the total area of the sample (n=3). Otherwise, the sample was evaluated as "fail (indicated as F)".

--Workability--

The workability was examined based on the extrusion property from the cartridge and various conditions of sample preparation.

The sample was rated according to the following:
Excellent (A), Good (B), Fair (C), and Poor (D).

--Comprehensive Evaluation as Sealant--

The sample was rated according to the following:
Excellent (A), Good (B), Fair (C), and Poor (D).

Example 2

A curable composition was prepared as in EXAMPLE 1 but with 100 parts by weight of P8 obtained in SYNTHETIC EXAMPLE 8 as the reactive silicon group-containing oxyalkylene polymer and evaluated as in EXAMPLE 1.

Example 3

A curable composition was prepared as in EXAMPLE 1 but with 100 parts by weight of P5 obtained in SYNTHETIC EXAMPLE 5 as the reactive silicon group-containing oxyalkylene polymer and evaluated as in EXAMPLE 1.

Example 4

A curable composition was prepared as in EXAMPLE 1 but with 100 parts by weight of P6 obtained in SYNTHETIC EXAMPLE 6 as the reactive silicon group-containing oxyalkylene polymer and evaluated as in EXAMPLE 1.

Example 5

A curable composition was prepared as in EXAMPLE 1 but with 100 parts by weight of P10 obtained in SYNTHETIC EXAMPLE 10 as the reactive silicon group-containing oxyalkylene polymer and 0.1 part by weight of dibutyltin dilaurate as the curing catalyst. The composition was evaluated as in EXAMPLE 1.

Comparative Example 1

A curable composition was prepared as in EXAMPLE 1 but without any plasticizer and evaluated likewise.

Comparative Example 2

A curable composition was prepared as in EXAMPLE 1 but with 100 parts by weight of P7 obtained in SYNTHETIC EXAMPLE 7 as the reactive silicon group-containing oxyalkylene polymer and evaluated likewise.

Comparative Example 3

A curable composition was prepared as in EXAMPLE 1 but with 100 parts by weight of P9 obtained in SYNTHETIC EXAMPLE 9 as the reactive silicon group-containing oxyalkylene polymer and evaluated likewise.

The components and evaluation results of EXAMPLES 1 to 5 are shown in Table 1. The components and the evaluation results of COMPARATIVE EXAMPLES 1 to 3 are shown in Table 2.

TABLE 1

|  | EXAMPLE 1 | EXAMPLE 2 | EXAMPLE 3 | EXAMPLE 4 | EXAMPLE 5 |
|---|---|---|---|---|---|
| Type of polymer | P4 | P8 | P5 | P6 | P10 |
| Polymer content (phr) | 100 | 100 | 100 | 100 | 100 |
| Number-average molecular weight | 37,000 | 30,200 | 37,000 | 37,000 | 37,000 |
| Number of reactive silicon group per molecule of reactive silicon group-containing oxyalkylene polymer | 1.3 | 1.3 | 1.0 | 0.8 | 1.3 |
| DiDP (phr) | 60 | 60 | 60 | 60 | 60 |
| Calcium carbonate (phr) | 120 | 120 | 120 | 120 | 120 |
| Titanium oxide (phr) | 20 | 20 | 20 | 20 | 20 |
| Polyamide wax (phr) | 2 | 2 | 2 | 2 | 2 |
| Vinyltrimethoxysilane (phr) | 2 | 2 | 2 | 2 | 2 |
| N-(β-Aminoethyl)-γ-aminopropyltrimethoxysilane (phr) | 3 | 3 | 3 | 3 | 3 |
| Dibutyltin bisacetylacetonate (phr) | 1 | 1 | 1 | 1 | 0 |
| dibutyltin dilaurate (phr) | 0 | 0 | 0 | 0 | 0.1 |
| M300 (MPa) | 0.30 | 0.34 | 0.24 | 0.10 | 0.52 |
| Elongation at break (%) | 1,260 | 1,140 | 1,330 | 1,400 | 650 |
| Recovery rate (%) | 2 | 0 | 0 | 0 | 5 |
| ASTM C719 (CLASS100/50) dynamic durability testing (mortar substrate) | P | P | P | P | P |
| Workability | A | A | A | A | B |
| Comprehensive evaluation as sealants | A | A | A | B | B |

DiDP: Diisodecyl phthalate
M300: Modulus at 300% elongation
Recovery rate: after 7 days of 50% compression at 70° C.

TABLE 2

|  | COMPARATIVE EXAMPLE 1 | COMPARATIVE EXAMPLE 2 | COMPARATIVE EXAMPLE 3 |
|---|---|---|---|
| Type of polymer | P4 | P7 | P9 |
| Polymer content (phr) | 100 | 100 | 100 |
| Number-average molecular weight | 37,000 | 37,000 | 19,000 |
| Number of reactive silicon group per molecule of reactive silicon group-containing oxyalkylene polymer | 1.3 | 0.6 | 1.3 |
| DiDP (phr) | 0 | 60 | 60 |
| Calcium carbonate (phr) | 120 | 120 | 120 |
| Titanium oxide (phr) | 20 | 20 | 20 |
| Polyamide wax (phr) | 2 | 2 | 2 |
| Vinyltrimethoxysilane (phr) | 2 | 2 | 2 |
| N-(β-Aminoethyl)-γ-aminopropyltrimethoxysilane (phr) | 3 | 3 | 3 |
| Dibutyltin bisacetylacetonate (phr) | 1 | 1 | 1 |
| dibutyltin dilaurate (phr) | 0 | 0 | 0 |
| M300 (MPa) | 0.35 | 0.03 | 0.62 |

TABLE 2-continued

|  | COMPARATIVE EXAMPLE 1 | COMPARATIVE EXAMPLE 2 | COMPARATIVE EXAMPLE 3 |
|---|---|---|---|
| Elongation at break (%) | 1,200 | 1,150 | 620 |
| Recovery rate (%) | 0 | 0 | 0 |
| ASTM C719 (CLASS100/50) dynamic durability testing (mortar substrate) | P | F | F |
| Workability | D | C | B |
| Comprehensive evaluation as sealants | D | D | D |

DiDP: Diisodecyl phthalate
M300: Modulus at 300% elongation
Recovery rate: after 7 days of 50% compression at 70° C.

Tables 1 and 2 show that a sealant containing a reactive silicon group-containing oxyalkylene polymer (A) having a number-average molecular weight of 20,000 to 50,000 and 0.8 or more of reactive silicon groups per molecule on average, a plasticizer (B), a filler (C), and a curing catalyst (D), in particular, a sealant containing 10 parts by weight or more of the plasticizer (B) per 100 parts by weight of the reactive silicon group-containing oxyalkylene polymer, has satisfactory workability. Moreover, the cured product prepared using this sealant has satisfactory dynamic durability and mechanical properties desirable as sealants.

The invention claimed is:

1. A sealant comprising an oxyalkylene polymer (A) having a number-average molecular weight of 30,200 to 37,000 and 0.8 or more of reactive silicon groups per molecule on average; 10 parts by weigbt or more of a plasticizer (B) per 100 parts by weight of the polymer (A); a filler (C); and a curing catalyst (D).

2. The sealant according to claim 1, wherein the main chain skeleton of the polymer (A) is prepared in the presence of a double metal cyanide complex acting as a catalyst.

* * * * *